C. J. ANDERSON.
SHOCK ABSORBER.
APPLICATION FILED NOV. 28, 1914.

1,151,326.

Patented Aug. 24, 1915.
2 SHEETS—SHEET 1.

WITNESSES
F. C. Barry
Geo. S. Brock

INVENTOR
Charles J. Anderson
BY Munn & Co.
ATTORNEYS

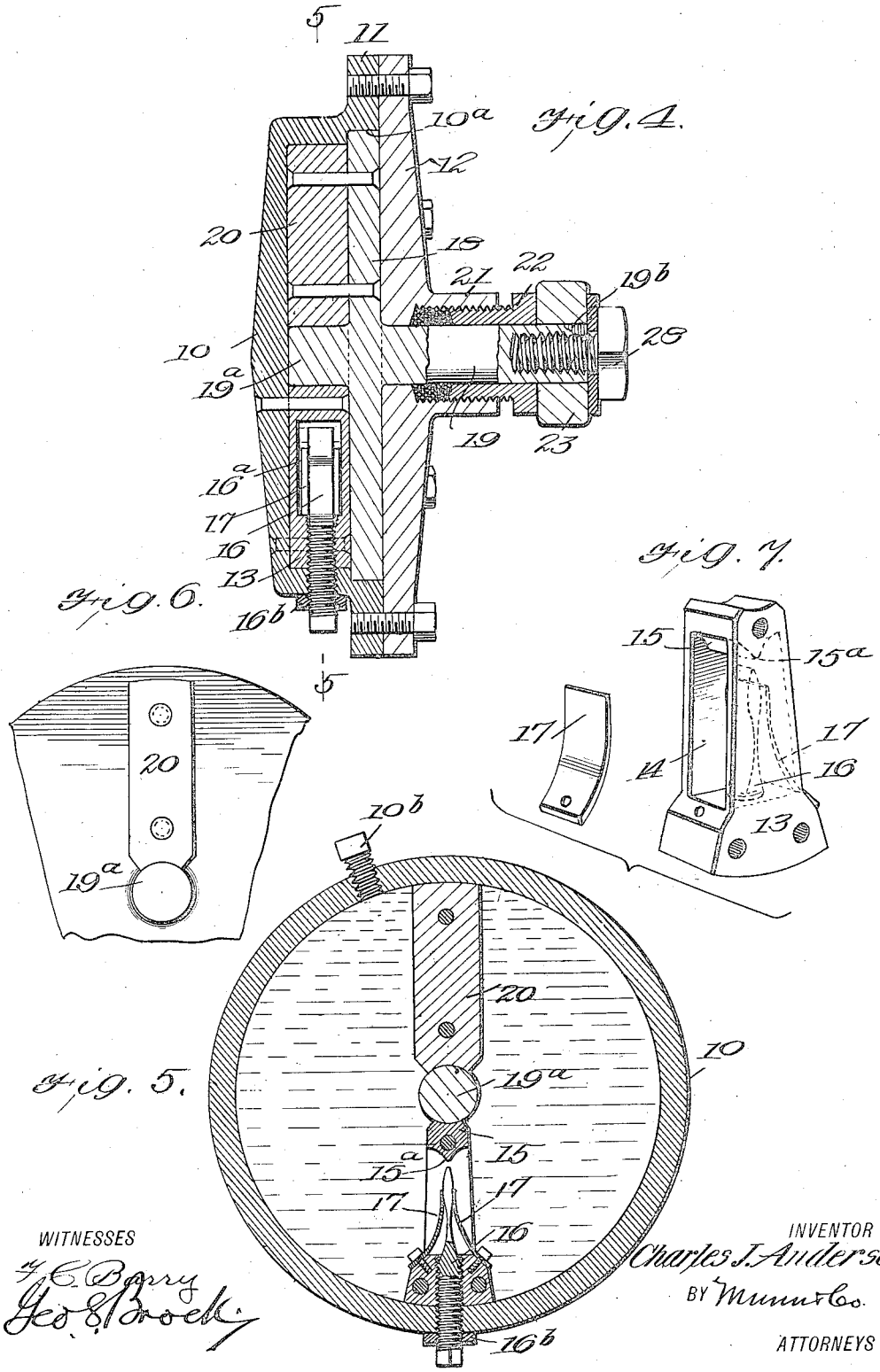
C. J. ANDERSON.
SHOCK ABSORBER.
APPLICATION FILED NOV. 28, 1914.
1,151,326.
Patented Aug. 24, 1915.
2 SHEETS—SHEET 2.

UNITED STATES PATENT OFFICE.

CHARLES J. ANDERSON, OF MELROSE, OREGON.

SHOCK-ABSORBER.

1,151,326.

Specification of Letters Patent.   Patented Aug. 24, 1915.

Application filed November 28, 1914. Serial No. 874,405.

*To all whom it may concern:*

Be it known that I, CHARLES J. ANDERSON, a citizen of the United States, and a resident of Melrose, in the county of Douglas and State of Oregon, have made a new and useful Improvement in Shock - Absorbers, of which the following is a specification.

My invention relates to improvements in shock absorbers for vehicles and has for its object to check and prevent shocks and jolts due to excessive vibration or oscillation of the body member of a spring supported vehicle incident to the wheels of the vehicle passing over uneven places or obstructions in a road and also to provide an easy and uniform running motion to the vehicle.

With these and other objects in view my invention consists in certain novel features of construction; arrangement and combination of parts as will be hereinafter fully described and pointed out in the claims, reference being had to the accompanying drawings in which—

Figure 1:
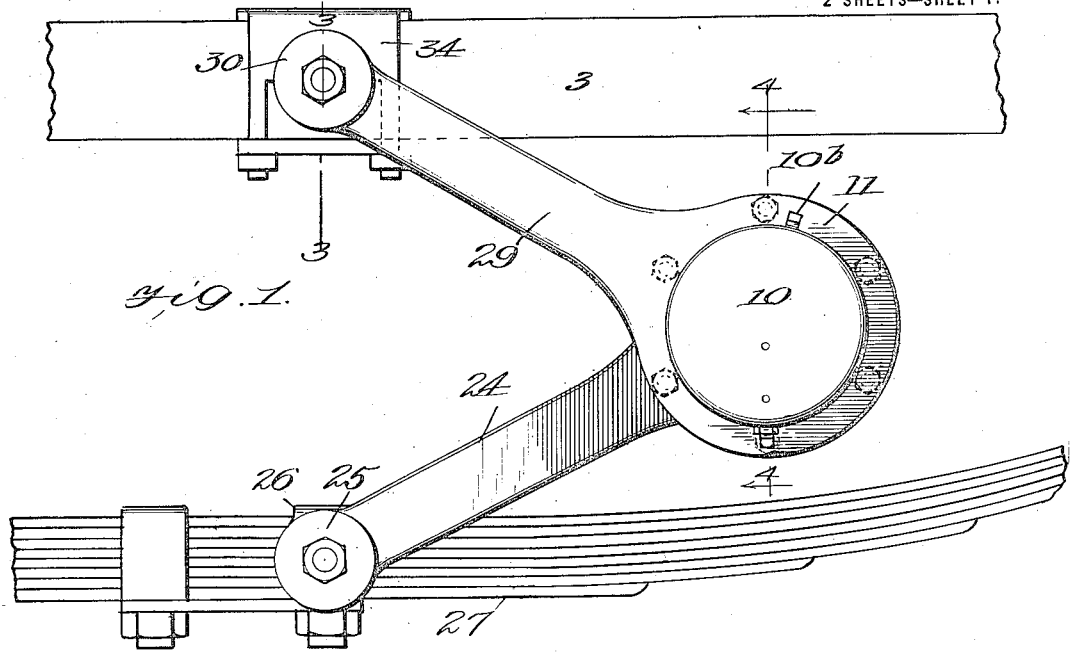
Figure 2:
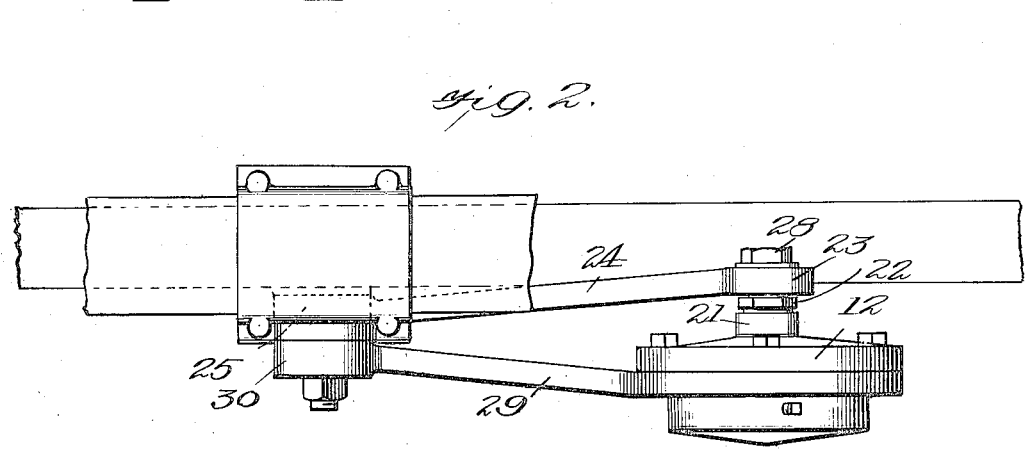
Figure 3:
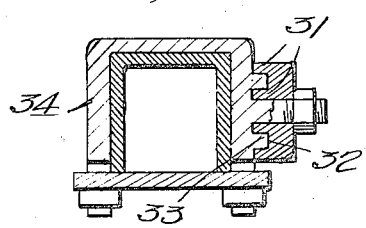

Figure 1 is a side elevation of my device as in use. Fig. 2 is a top plan view. Fig. 3 is a transverse section of detail of one of the connections. Fig. 4 is a vertical section taken on line 4—4 of Fig. 1. Fig. 5 is a vertical section on line 5—5 of Fig. 4. Fig. 6 is an elevation of a radial abutment within the casing. Fig. 7 is a perspective view of the valved piston member.

In carrying out my invention I use an oil containing casing 10 generally of circular shape having the flanges 11 to which is bolted the inside wall or cover 12 as shown in Fig. 4; a radial block 13 is bolted or riveted to the inner wall of the casing 10 and said block has a passage or slot 14 through the same as shown in Figs. 5 and 7 said opening having its inner wall 15 curved and tapered to a point at its center 15ª; passing centrally through the radial block 13 and through the casing is a regulating screw valve 16 which is feathered toward its inner end to make it resilient or springy and of less width than the opening 14 through block 13 so that a space 16ª is left at each side of the screw valve 16 as shown in Fig. 4 and also between the inner end of the screw and the inner end wall 15. The inner end of the feathered screw 16 is rounded and slides against two plate springs 17 feathered or thinned toward their ends and secured to the block 13 at each side of said screw 16 as indicated in Fig. 7, when the screw 16 is moved up or down to regulate the opening 14 and leave more or less space for oil to flow through; a lock nut 16ᵇ is threaded on screw valve 16 outside the casing to lock the said valve in place against retrograde movement by jar or strain.

Within the casing is the disk 18 fitting within the shoulder 10ª and integral with a shaft 19 the forward part 19ª of which projects beyond the disk 18 to the inner wall of the casing and in the center of the oil chamber formed therein; securely fastened to the inner face of the disk 18 is a radial piston blade 20 somewhat similar to radial block 13 disposed in the same radial line but diametrically opposite with respect to said block 13; thus it is seen that the block 13 and the blade 20 extend from the outer portion of the casing toward the center thereof having their inner ends rounded to fit the circular projection 19ª of the shaft 19 as plainly shown in Figs. 4 and 5.

One end of shaft 19 is squared as at 19ᵇ where it projects through a stuffing box formed by the annular collar 21 on the cover plate 12 and the gland nut 22; on this squared portion is fitted one end 23 of a lever 24 the other end 25 of which is secured to the clip 26 on the spring 27; the lever end is held on the squared portion by the lock bolt 28 screwed into the end of shaft 19.

The casing 10 has its flange 11 at one side prolonged into an integral arm 29 constituting a lever the other end 30 of which is secured to the chassis 3 of the automobile as shown in Fig. 1. The ends of the levers 24 and 29 where they connect with the spring and chassis are provided on their inner faces with the annular ribs 31 and annular grooves 32 between them into which fit similar annular ribs 33 on the clip 34 as shown in Fig. 3 said clips being suitably mounted on the springs and the chassis. To fill the casing with oil when necessary, I provide a screw plug 10ᵇ and I preferably use mineral oils.

It will be understood that when the wheels of an automobile pass over uneven places or obstructions in the road an abnormal shock is imparted to the running gear and thence to the body of the vehicle and the rebound or recoil then takes place. By using my device which is as follows: the ends of the levers 24 and 29 where they are attached to the chassis and springs approach or move away from each other depending on whether the shock is upwardly or a rebound downwardly; in either instance, the blade 20 which acts as an oscillating piston will move away from its normal position shown in Fig. 5 toward the valved abutment block 13, the blade 20 being rigid with disk 18 which carries the shaft 19 upon the squared portion 19ᵇ of which is mounted the lever 24; the lever 29 which is integral with the casing 10 controls the movement of the block 13 and as the ends of said lever approach or move away from each other the blade 20 and the said blocks 13 approach each other and tend to trap the oil between them; the opening 14 however permits some of the oil to gradually pass from one side of the block to the other thus lessening the shock by a cushioning action; in other words absorbing the shock; the resistance of the abutment 13 to the oil between it and the blade or piston 20 is controlled and regulated by the screw valve 16 so that the rapidity with which oil passes through the opening 14 can be adjusted to suit varying conditions of the roads. As the valve 16 is feathered down to form a spring blade it is obvious that pressure on either side will cause it to move to one side or the other away from the tapered point 15ᵃ allowing the oil to pass through more freely and thus adding to the cushioning effect instead of a jolt as would ensue if the oil is checked too quickly; the springs 17 on each side of the screw valve 16 receive any shock imparted to the valve 16 and prevent it being moved too far in either direction.

I claim:

1. In a shock absorber the combination with a liquid filled casing, having a radial valved abutment therein, an axially turning disk fitted within said casing and having a radial piston blade secured thereto, and levers rigidly connected with said casing and disk operably connected with the spring gear and body of the vehicle.

2. In a shock absorber the combination with a liquid filled casing, a radial abutment therein having an opening therethrough, a disk axially turning in said casing and having a radial piston blade secured thereto, levers rigidly connected with said casing and disk and to the spring gear and body of the vehicle, and means for regulating the size of the opening through the abutment.

3. In a shock absorber, the combination with a liquid filled casing having a radial abutment therein, said abutment having a passage therethrough, a valve controlling said passage, a disk axially turning in said casing and having a radial piston blade secured thereto, and levers rigidly secured to the casing and disk and to the spring gear and body of a vehicle.

4. The combination of a cylindrical casing containing liquid and having a radial abutment within the same, said abutment provided with an opening therethrough, a resilient movable valve for regulating the size of said opening and a disk axially turning within said casing and having a radial blade thereon.

5. In a shock absorber the combination with a cylindrical casing filled with liquid and having a radial block therein, said block having an opening therethrough, a screw valve having a flexible stem projecting longitudinally into said opening and controlling the size thereof, bracing members at the sides of said flexible stem, and an axially turning disk within said casing and carrying a radial piston blade in opposition to the abutment block.

6. In a shock absorber the combination with a cylindrical casing filled with liquid and having a radial block therein, said block having an opening therethrough, a screw valve having a resilient stem projecting longitudinally into said abutment opening and controlling the size thereof, springs at each side of said valve stem and bracing the same, and an axially turning disk within the casing and carrying a radial piston blade in opposition to the abutment block.

7. In a shock absorber, the combination with a cylindrical casing filled with liquid and having a radial abutment block therein, said block having an opening therethrough, the inner wall of the free end of said block inclined in opposite directions, a screw valve having a tapered resilient stem projecting longitudinally into said abutment opening and controlling the size thereof, feathered springs at each side of said valve and bracing the same, and an axially turning disk within said casing and carrying a radial piston blade in opposition to the abutment block.

CHARLES J. ANDERSON.

Witnesses:
ALICE BLACK,
OLIVER PERRY COSHOW.